United States Patent
Maliar et al.

(10) Patent No.: US 9,664,353 B2
(45) Date of Patent: May 30, 2017

(54) DEVICE FOR EMITTING A LIGHT BEAM AND LIGHT, ESPECIALLY FOR AN AUTOMOTIVE VEHICLE, COMPRISING SAID DEVICE

(71) Applicant: VALEO VISION BELGIQUE, Meslin l'Eveque (BE)

(72) Inventors: Remi Maliar, Saint Saulve (FR); Cyril Herbin, Potelle (FR); Frederic Hayez, Haveluy (FR); Olivier Draguet, Manage (BE)

(73) Assignee: Valeo Vision Belgique, Meslin l'Eveque (BE)

( * ) Notice: Subject to any disclaimer, the term of this patent is extended or adjusted under 35 U.S.C. 154(b) by 229 days.

(21) Appl. No.: 14/409,850

(22) PCT Filed: Jul. 15, 2013

(86) PCT No.: PCT/EP2013/064882
§ 371 (c)(1),
(2) Date: Dec. 19, 2014

(87) PCT Pub. No.: WO2014/012878
PCT Pub. Date: Jan. 23, 2014

(65) Prior Publication Data
US 2015/0184819 A1 Jul. 2, 2015

(30) Foreign Application Priority Data
Jul. 19, 2012 (FR) ...................... 12 56966

(51) Int. Cl.
*F21V 17/02* (2006.01)
*F21S 8/10* (2006.01)
(Continued)

(52) U.S. Cl.
CPC ....... *F21S 48/1721* (2013.01); *F21S 48/1154* (2013.01); *F21S 48/1216* (2013.01);
(Continued)

(58) Field of Classification Search
CPC ............... F21S 48/1109; F21S 48/1154; F21S 48/1216; F21S 48/1266; F21S 48/1715; F21S 48/1721
(Continued)

(56) References Cited

U.S. PATENT DOCUMENTS 3,124,309 A 3/1964 Cantoni et al.
7,997,779 B2 8/2011 Futami
(Continued)

FOREIGN PATENT DOCUMENTS

AT 8358 T 6/2006
DE 102010008596 A1 8/2011
(Continued)

*Primary Examiner* — Jason Moon Han
(74) *Attorney, Agent, or Firm* — Jacox, Meckstroth & Jenkins

(57) ABSTRACT

A device for emitting a light beam, comprising a lens and means for producing a cut-off line in the beam, said device being configured to allow a position of the cut-off line to be adjusted in a given direction, especially vertically, depending on an angular position of the lens about a hinge axis, the lens comprising what is called an optical part for transmission of the beam the and a part that hinges in rotation about said hinge axis, said hinge part and said optical part being made of an integral piece of material.
The invention also relates to a light, especially for an automotive vehicle, comprising said emitting device.

22 Claims, 3 Drawing Sheets

(51) Int. Cl.
*F21W 101/10* (2006.01)
*F21Y 101/00* (2016.01)

(52) U.S. Cl.
CPC ....... *F21S 48/1266* (2013.01); *F21S 48/1109* (2013.01); *F21S 48/328* (2013.01); *F21W 2101/10* (2013.01); *F21Y 2101/00* (2013.01)

(58) Field of Classification Search
USPC ................. 362/507, 509, 512, 520, 543–545
See application file for complete search history.

(56) References Cited

U.S. PATENT DOCUMENTS

| | | |
|---|---|---|
| 2007/0058386 A1 | 3/2007 | Albou |
| 2009/0067186 A1 | 3/2009 | Futami |

FOREIGN PATENT DOCUMENTS

| | | |
|---|---|---|
| EP | 1739346 A1 | 1/2007 |
| EP | 1762776 A1 | 3/2007 |
| EP | 2138760 A2 | 12/2009 |
| WO | WO 2012098142 A1 | 7/2012 |

DEVICE FOR EMITTING A LIGHT BEAM AND LIGHT, ESPECIALLY FOR AN AUTOMOTIVE VEHICLE, COMPRISING SAID DEVICE

CROSS-REFERENCE TO RELATED APPLICATIONS

This application claims priority to PCT Application No. PCT/EP2013/064882 filed Jul. 15, 2013 and French Application No. 1256966 filed Jul. 19, 2012, which are incorporated herein by reference and made a part hereof.

BACKGROUND OF THE INVENTION

1. Field of the Invention

The present invention relates to a device for emitting a light beam and a light, especially for an automotive vehicle, comprising the device.

2. Description of the Related Art

Lights are known allowing a light beam that is bounded by a cut-off line at a certain level above ground level to be produced. The cut-off line is produced using masks and/or reflectors.

In order to ensure that the beam is neither too high nor too low, it is necessary for adjustment of the vertical position of the cut-off line to be possible. To make this adjustment, devices are employed that allow the masks or reflectors, movable by design, to be moved.

This being so, the use of hinged masks or reflectors has certain drawbacks and it is advantageous to provide solutions employing other movable members.

What is needed, therefore, is a device that overcomes one or more of the problems in the prior art.

SUMMARY OF THE INVENTION

The invention therefore provides a device for emitting a light beam, comprising a lens and means for producing a cut-off line in the beam, the device being configured to allow a position of the cut-off line to be adjusted in a given direction, especially vertically, depending on an angular position of the lens about a hinge axis, the lens comprising what is called an optical part for transmission of the beam and a part that hinges in rotation about the hinge axis.

Thus, a beam-emitting device is obtained that does not depend on hinged masks or reflectors to position the cut-off line of the beam.

The optical part and the hinge part are advantageously made of the same material.

Advantageously, the hinge part and the optical part are made of an integral piece of material. The lens may thus be a single molded part. This also improves the precision with which the emitting device can be mounted.

In various embodiments of the invention, which may be taken together or separately:

the device comprises a light source, especially a light-emitting diode;

the lens and the light source are arranged in order to form the cut-off line;

the hinge axis substantially passes through the light source;

the lens has a focal point at the light source;

the optical part extends from arms of the hinge part while getting radially further away from the hinge axis;

the arms comprise swivels for hinging the lens about the hinge axis;

the hinge part comprises means for driving the lens in rotation;

the driving means comprise at least one ribbed fork intended to interact with an adjusting screw oriented transversely and especially orthogonally to the rotation axis;

the driving means are positioned on either side of the optical part, along the hinge axis;

the device comprises a fixed holder for the lens;

the fixed holder comprises arms for the hinging of lens in rotation;

the holder comprises an electronic control board through which the hinge arms extend radially towards the hinge axis; and the control board is radially offset relative to the light source.

The invention also relates to a light, especially for an automotive vehicle, comprising the emitting device described above. The light for example comprises a casing taking the form of a substantially cylindrical jacket.

The casing comprises an internal face that may be equipped with ribs for guiding the hinge arms of the holder.

The internal face of the casing advantageously comprises ribs for snap-fastening the hinge part of the lens.

According to one aspect of the invention, the casing is configured to allow the holder to be rear-mounted. In one variant, the casing is configured to allow the casing to be front-mounted, especially along the orientation the guiding and/or snap-fastening ribs provided on the casing.

The light may be a fog light, emitting a beam with a linear cut-off, intended to be an upper horizontal cut-off line when the light is in operation, although this application must in no way be considered as limiting.

Other features and advantages of the invention will become apparent on reading the following detailed description which will be better understood with reference to the appended drawings, in which:

BRIEF DESCRIPTION OF THE ACCOMPANYING DRAWINGS

DETAILED DESCRIPTION OF THE PREFERRED EMBODIMENTS

Figure 1:
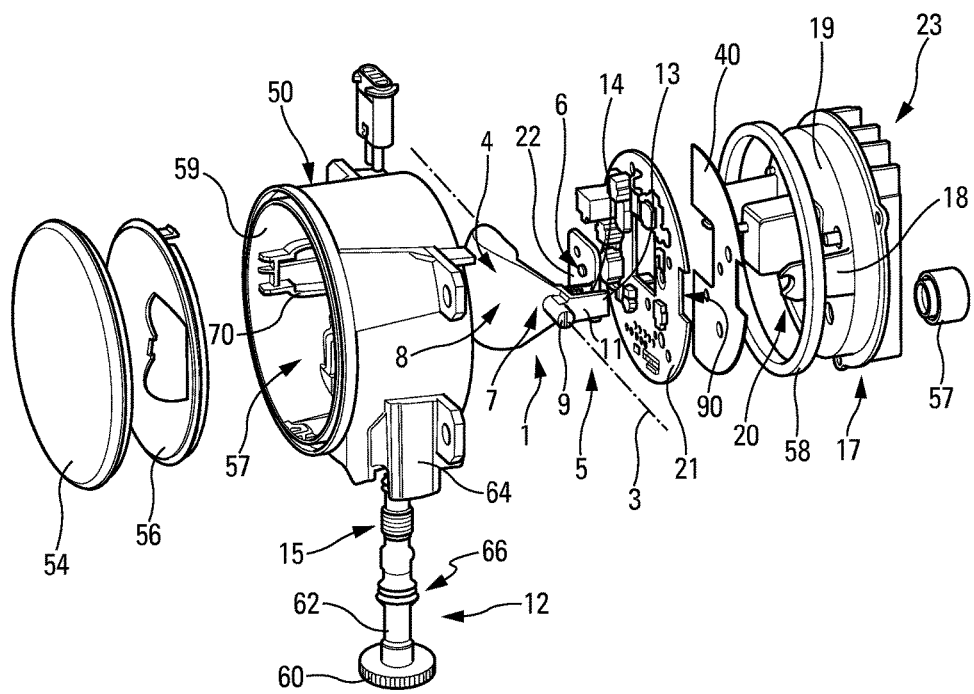
FIG. 1 is an exploded perspective view that shows a first embodiment of the emitting device and the light according to the invention.
Figure 2:
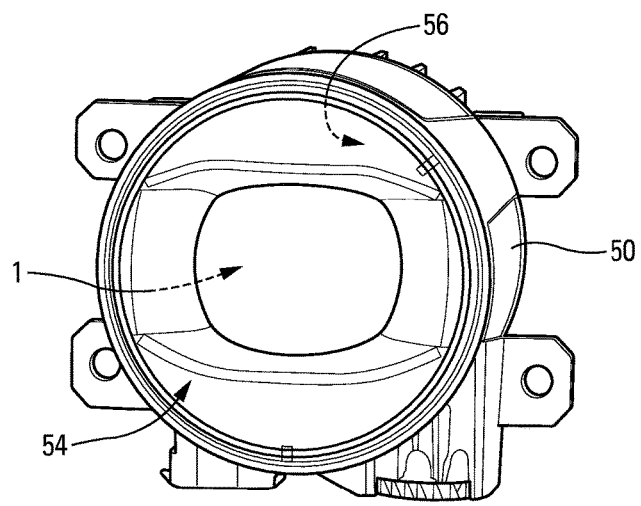
FIG. 2 is a perspective view of the light in FIG. 1, illustrated assembled.

As illustrated in FIGS. 1 and 2, the device for emitting a light beam according to the invention comprises at least one lens 1 and means for producing a cut-off line in the beam. By this it will be understood that the device allows a truncated light beam, or a light beam that at the very least exhibits a very rapid decrease in emitted luminosity below a certain level corresponding to the cut-off line, to be emitted. For the sake of simplicity, the beam may be considered to be limited under a plane, especially one intended to be substantially horizontal and to be located at a certain height above ground level.

According to the invention, the device is configured to allow a position of the beam cut-off to be adjusted in a given direction, especially the vertical direction, depending on an angular position of the lens 1 about a hinge axis 3 intended to be oriented along the Y-Y axis of the vehicle equipped with the device. Still according to the invention, to allow this adjustment to be carried out, the lens 1 comprises what is called an optical part 4 for transmission of the beam and a hinge part 5 that hinges in rotation about the hinge axis 3.

A solution is thus obtained by virtue of which adjustment of the cut-off line is carried out by actuating a member, namely the lens 1, serving for transmission of the beam.

The optical part 4 and the hinge part 5 are advantageously made of the same material. Advantageously, the hinge part 5 and the optical part 4 are made of an integral piece of material. The lens 1 may thus be a single molded part.

The device furthermore comprises a light source 6 especially a light-emitting diode, placed upstream of the lens 1 along an optical axis of the device.

The cut-off line is obtained here by a mutual arrangement of the lens 1 and of the light source 6, as is known in particular from documents EP 1 762 776, which is equivalent to U.S. Patent Publication 2007/0058386, especially the embodiments corresponding to FIG. 11 and following, and/or EP 1 970 619, especially the embodiment in FIG. 1.

Advantageously, the hinge axis 3 substantially passes through the light source 6. The lens 1 will furthermore have a focal point at the light source 6. A beam is thus obtained the characteristics of which do not vary as a function of the angular position of the lens 1 and which therefore do not depend on the position of the cut-off line.

The optical part 4 extends, for example, from arms 7 of the hinge part 5 while getting radially further away from the hinge axis 3. In other words, the lens 1 comprises sides extending towards the hinge axis 3 from a frontal zone 8 of the lens 1, the frontal zone 8 being the part of the lens 1 located furthest from the hinge axis 3. The optical part 4 of the lens 1 in particular extends to the frontal zone 8.

The arms 7 are located on either side of the optical part 4, along the direction of the hinge axis 3. They for example comprise swivels 9 for hinging the lens 1 about the hinge axis 3. The swivels 9 are cylindrical in shape and are oriented along the hinge axis 3. The device is configured to allow the swivels 9 to rotate on themselves about the hinge axis 3 and, therefore, the entire lens 1 to rotate about the same axis.

Between the swivels 9 the lens 1 leaves a free space where the light source 6 can be housed level with the hinge axis 3, as described above.

The hinge part 5 furthermore here comprises means for driving the lens 1 in rotation. The driving means for example comprise at least one fork 11 comprising ribs intended to interact with an adjusting screw 12 that is oriented transversely and especially orthogonally to the hinge axis 3 and/or to the ribs 14. The adjusting screw 12 will be described in more detail below.

Here, the forks 11 emerge from the swivels 9. They comprise lateral sides 13 radially oriented relative to the rotation axis 3. The lateral sides 13 of the forks 11 are equipped with ribs 14 located mutually facing on each of the lateral sides 13. The ribs 14 thus define a counterpart to a thread 15 located on the adjusting screw 12. The ribs 14 advantageously extend radially and/or lie parallel to one another.

The forks 11 will furthermore advantageously comprise a tab 16 (FIGS. 4 and 5) located, especially centered, between their radial sides 13. The tab 16 for example extends radially and serves as a radial stop for the adjusting screw 12.

The driving means are advantageously positioned on either side of the optical part 4 of the lens 1, along the hinge axis 3. In other words, here a fork 11 such as described above is provided for each swivel 9. In this way an emitting device that can be used in lights intended to be located either on the right-hand side or the left-hand side of a vehicle is obtained via symmetrical placement of the adjusting screw 12.

The device may furthermore comprise a fixed holder 17 for holding the lens 1. The fixed holder 17 here comprising arms 18 enabling the rotational hinging of the lens 1. The arms 18 are intended to interact with the hinge part 5 of the lens 1, in particular the swivels 9, in order to provide the lens 1 with a degree of rotational freedom about the hinge axis 3 under the action of the adjusting screw 12. The arms 18 emerge radially from a base part 19 of the fixed holder 17 and they have a forked distal end or a hinge fork 20 oriented radially so as to receive the swivels 9 while leaving them free to rotate about the hinge axis 3.

The fixed holder 17 here furthermore comprises an electronic control board 21 located facing the base part 19 of the holder 17. The control board 21 especially serves to control the light source 6. The hinge arms 18 of the fixed holder 17 lie on either side of the control board 21, along the hinge axis 3.

The control board 21 is advantageously radially offset along the rotation axis, i.e. here, along the longitudinal overall emission axis OA of the light source 6, relative to the light source 6. In other words, the light source 6 is raised relative to the control board 21. It is thus easier to make the hinge axis 3 pass through the light source 6.

More precisely, here the light source 6 is located on a specific electronic board 22 of the device and the specific electronic board 22 is raised relative to the control board 21, along the hinge axis 3. The specific electronic board 22 is, for example, an IMS board whereas the control board 21 is, for example, a board such as an FR4 board. The specific electronic board 22 is borne by the control board 21.

The emitting device will furthermore possibly comprise a heat sink 23 provided behind the base part 19 of the fixed holder 17 and/or a sheet of adhesive material 40 allowing the control board 21 to be fastened to the base part 19 of the fixed holder 17. The heat sink 23 is more particularly in heat exchange relationship with the specific electronic board 22.

This being so, the invention also relates to a light comprising the emitting device.

The light comprises a casing 50 defining a housing 52 for the emitting device. Conventionally, the light may furthermore comprise a front glass 54 and optionally a style part or mask 56 located between the front glass 54 and the lens 1, along the optical axis of the emitting device.

Here the light furthermore comprises an annular seal 58 intended to seal the fixed holder 17 and the casing 50. It may also comprise an aerating device 57 allowing the housing 52 to be brought into communication with the exterior.

The light also comprises the adjusting screw 12. Here the latter comprises a head 60 allowing it to be handled, a rod 62 extending axially from the head 60 and, along the rod 62, the thread 15 that is intended to interact with the ribs 14 of the lens 1. The thread 15 is configured to allow the lens 1 to be rotated in an angular range, for example of +/−5°.

Figure 3:
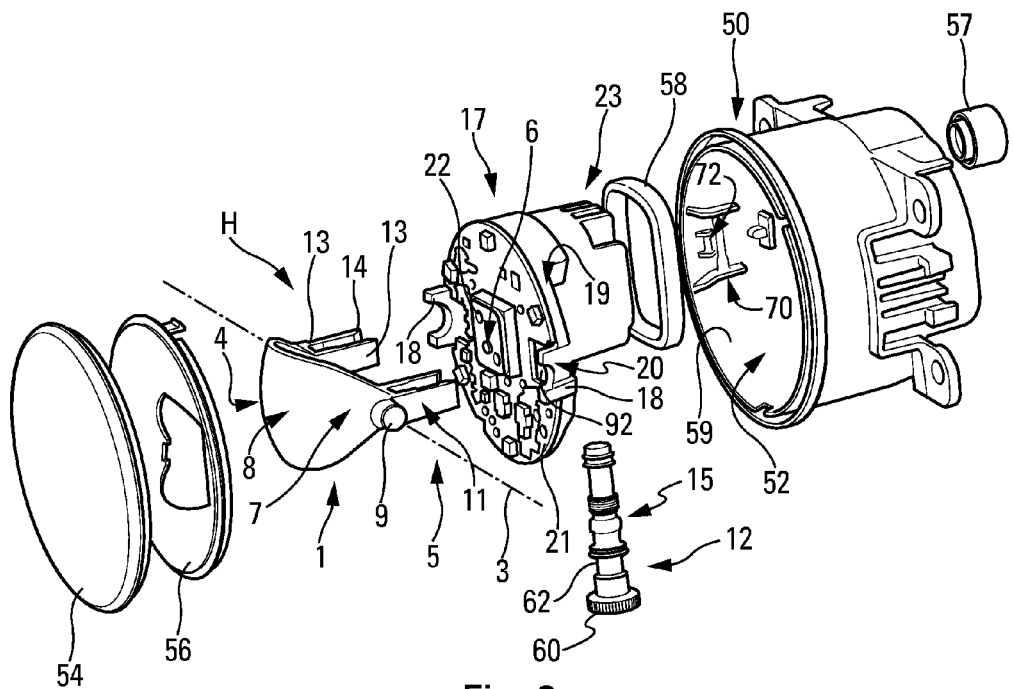
FIG. 3 is an identical view to FIG. 1 illustrating a variant embodiment of the invention.

In one possible embodiment, the fixed holder 17 may comprise an open or closed outline, namely it may respectively comprise an indent 90, as for example illustrated in FIG. 1, or a through-hole 92, as for example illustrated in FIG. 3. The indent 90 and the through-hole 92 are arranged so as to allow the fork 11 of the hinge part 5 to pass, and are sufficiently wide to provide clearance for the passage of the fork 11 of the hinge part 5. This allows the lens 1 to be longitudinally mounted into the casing and through the fixed holder 17.

The fork 11 of the hinge part 5 may be made to extend sufficiently through the indent 90 or through-hole 92 for the adjusting screw 12 to hinge with the fork 11 of the hinge part 5 behind the fixed holder 17. Thus, compactness is increased, which is particularly advantageous in the case of a fog light.

It is possible to produce the indent 90 or through-hole 92 in the fixed holder 17 between the hinge arms 18 of the fixed holder 17. This possibility is not limited to the illustrated examples.

The casing 50 comprises at least one well 64 for the passage of the adjusting screw 12, here two so that the light can be used in either a right-hand or left-hand position, as described above. The adjusting screw 12 comprises means 66, known to those skilled in the art, allowing it to hinge via a pivot connection in the wells 64.

The casing 50 for example takes the form of a substantially cylindrical jacket. The one or more wells 64 for the passage of the adjusting screws 12 are substantially oriented along two parallel chords inside the jacket.

The casing 50 comprises an internal face 59 equipped with ribs 70 for guiding the hinge arms 18 of the fixed holder 17. The guiding ribs 70 contribute to the fastening of the fixed holder 17 in the casing 50, via the hinge arms 18 of the fixed holder 17.

The internal face 59 of the casing 50 may furthermore comprise ribs 72 (not shown in FIG. 1) for snap-fastening the hinge part 5 of the lens 1 and in particular the swivels 9. The snap-fastening ribs 72 are configured to allow a pivot connection between the lens 1 and the casing 50.

In other words, under the action of the adjusting screw 12, the thread 15 interacts with the ribs 14 and drives the swivels 9 and therefore the lens 1 in rotation about the hinge axis 3, the swivels 9 being free to rotate in the hinge forks 20 of the fixed holder 17 and in the snap-fastening ribs 72 of the casing 50.

In the embodiment in FIGS. 1 and 2, the emitting device is rear-mounted and the casing 50 is closed at its longitudinal end opposite the front glass 54 by the fixed holder 17. The guiding and/or snap-fastening ribs 70 are then open towards the rear.

As illustrated in FIG. 3, in which the elements already described above reappear, the emitting device may also be front-mounted in the casing 50. The casing 50 is then closed at its end opposite that of the front glass 54 by a back plate 80 (not shown in this figure). The guiding ribs 70 and/or the snap-fastening ribs 72 are then open towards the front.

Figure 4:
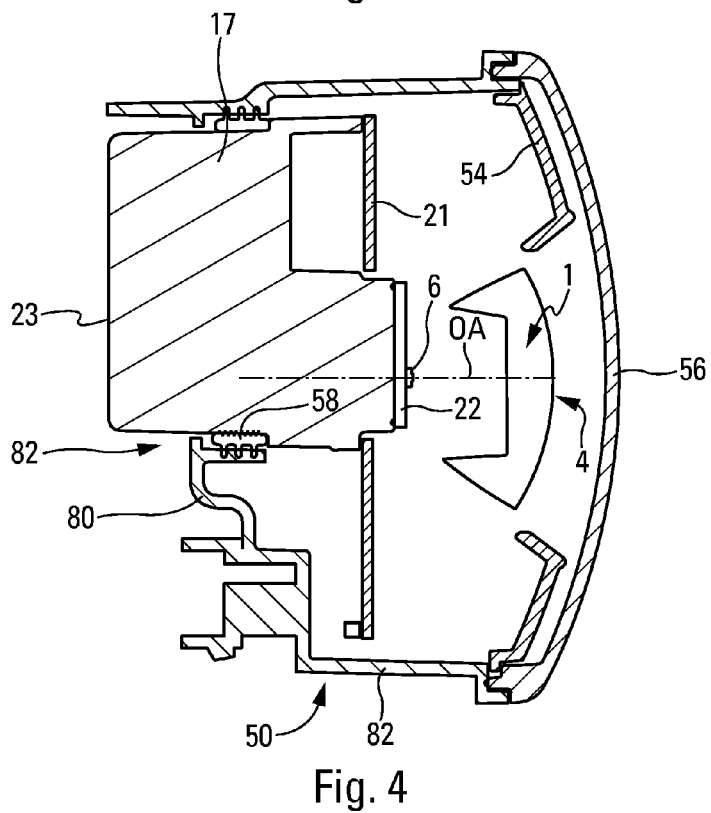
FIG. 4 is a cross-sectional view of a vertical diametral plane through the light in FIG. 3.
Figure 5:
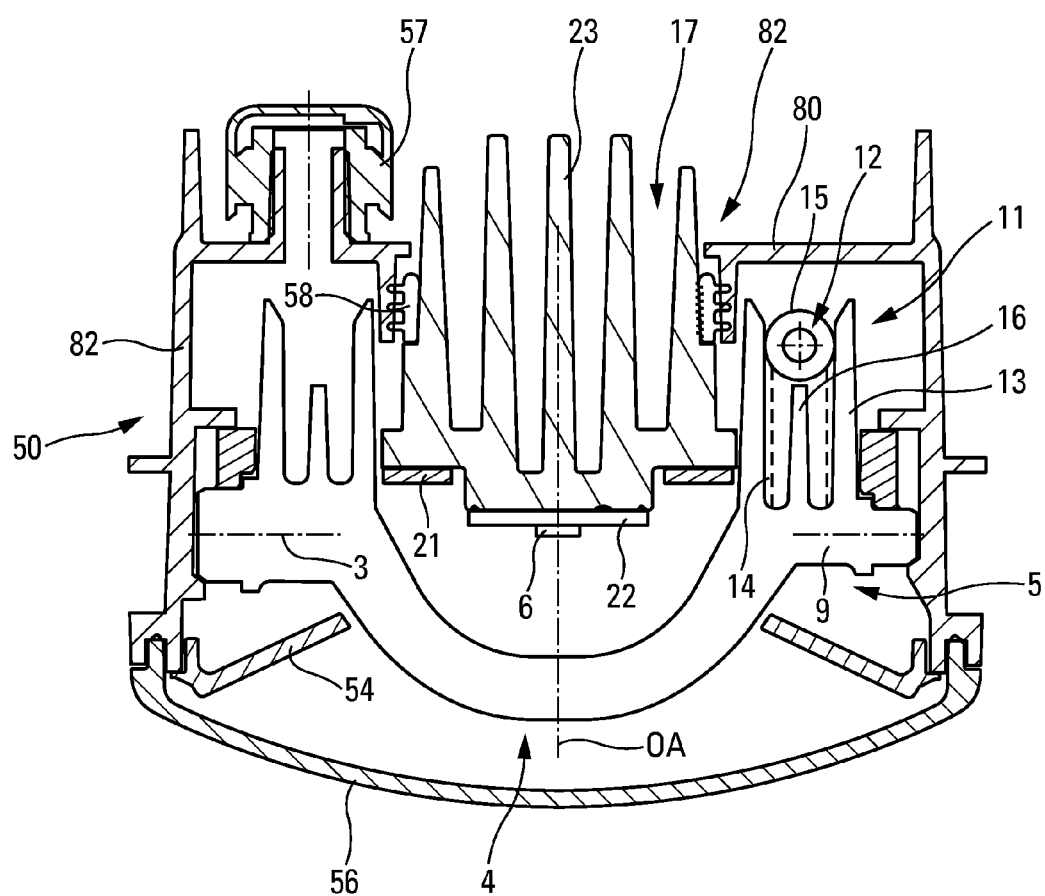
FIG. 5 is a cross-sectional view of a horizontal diametral plane through the light in FIG. 3.

As illustrated in FIGS. 4 and 5, the back plate 80 may possibly emerge from the material of the jacket or orifice 82 of the casing 50. The back plate 80 here contains an orifice 82 for passage of a longitudinal protrusion of the holder 17, in particular the heat sink 23. According to this aspect of the invention, the annular seal 58 seals against the back plate 80.

It will be noted that FIGS. 4 and 5 allow the position of the light source 6 along the hinge axis 3 and the interaction between the adjusting screw 12 and the fork 11, here the right-hand fork, of the hinge part 5 of the lens 1 to be more easily seen.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A device for emitting a light beam, comprising a lens and means for producing a cut-off line in the light beam, said device being configured to allow a position of said cut-off line to be adjusted in a given direction, especially vertically, depending on an angular position of said lens about a hinge axis, said lens comprising an optical part for transmission of the light beam and a hinge part that hinges in rotation about said hinge axis, said hinge part and said optical part being made of an integral single piece of material.

2. The device according to claim 1, in which a light source of said device and said lens are arranged in order to form said cut-off line.

3. The device according to claim 2, in which said hinge axis substantially passes through said light source.

4. The device according to claim 2, in which said optical part extends from arms of said hinge part while getting radially further away from said hinge axis.

5. The device according to claim 2, in which said hinge part comprises means for driving said lens in rotation.

6. The device according to claim 3, in which said light source is a light-emitting diode.

7. The device according to claim 6, comprising a fixed holder for holding said lens, said fixed holder comprising arms for the hinging of said lens in rotation.

8. The device according to claim 7, in which said fixed holder comprises an electronic control board through which said hinge arms extend radially towards said hinge axis, said control board being radially offset relative to said light source.

9. The device according to claim 6, in which said lens has a focal point at said light source.

10. The device according to claim 3, in which said lens has a focal point at said light source.

11. The device according to claim 10, comprising a fixed holder for holding said lens, said fixed holder comprising arms for the hinging of said lens in rotation.

12. The device according to claim 1, in which said optical part extends from arms of said hinge part while getting radially further away from said hinge axis.

13. The device according to claim 12, comprising a fixed holder for holding said lens, said fixed holder comprising arms for the hinging of said lens in rotation.

14. The device according to claim 12, in which said arms comprise swivels for hinging said lens about said hinge axis.

15. The device according to claim 1, in which said hinge part comprises means for driving said lens in rotation.

16. The device according to claim 15 in which said driving means comprise at least one fork equipped with ribs intended to interact with an adjusting screw oriented orthogonally to said rotation axis.

17. The device according to claim 16, in which said driving means are positioned on either side of said optical part along said hinge axis.

18. A light, especially for an automotive vehicle, comprising a device for emitting a light beam, comprising a lens and means for producing a cut-off line in the light beam, said device being configured to allow a position of said cut-off line to be adjusted in a given direction, especially vertically, depending on an angular position of said lens about a hinge axis, said lens comprising an optical part for transmission of the light beam and a hinge part that hinges in rotation about said hinge axis, said hinge part and said optical part being made of an integral single piece of material;

in which said light source is a light-emitting diode;

said device further comprising a fixed holder for holding said lens, said fixed holder comprising arms for the hinging of said lens in rotation.

19. The light according to claim 18, comprising a casing taking the form of a substantially cylindrical jacket, said casing comprising an internal face equipped with ribs for guiding said hinge arms of said fixed holder.

20. The light according to claim 19, in which said internal face of said casing comprises ribs for snap-fastening said hinge part of said lens.

21. A light, especially for an automotive vehicle, comprising a device for emitting a light beam, comprising a lens and means for producing a cut-off line in the light beam, said device being configured to allow a position of said cut-off line to be adjusted in a given direction, especially vertically, depending on an angular position of said lens about a hinge axis, said lens comprising an optical part for transmission of the light beam and a hinge part that hinges in rotation about said hinge axis, said hinge part and said optical part being made of an integral single piece of material;

in which said lens has a focal point at said light source;

said device further comprising a fixed holder for holding said lens, said fixed holder comprising arms for the hinging of said lens in rotation.

22. A light, especially for an automotive vehicle, comprising a device for emitting a light beam, comprising a lens and means for producing a cut-off line in the light beam, said device being configured to allow a position of said cut-off line to be adjusted in a given direction, especially vertically, depending on an angular position of said lens about a hinge axis, said lens comprising an optical part for transmission of the light beam and a hinge part that hinges in rotation about said hinge axis, said hinge part and said optical part being made of an integral single piece of material, in which a fixed holder comprises an electronic control board through which hinge arms extend radially towards said hinge axis, said electronic control board being radially offset relative to said light.

* * * * *